INVENTOR
HELMUT WELLER 3,112,118
PNEUMATIC SPRING SYSTEM FOR
MOTOR VEHICLES
Helmut Weller, Waldenbuch, near Stuttgart, Germany, assignor to Daimler-Benz Aktiengesellschaft, Stuttgart-Unterturkheim, Germany
Filed July 20, 1960, Ser. No. 44,088
Claims priority, application Germany July 25, 1959
4 Claims. (Cl. 280—6)

The present invention relates to a pneumatic spring system for motor vehicles which consists essentially of a pneumatic spring element operatively connected with or coordinated to a respective vehicle wheel each and of a height-regulating valve operatively connected with or coordinated to a respective pneumatic spring element each which are disposed in the pressure medium lines or conduits leading to the pneumatic spring elements.

With pneumatically spring-suspended motor vehicles of which the horizontal vehicle body position is adjusted and regulated by means of height-controlling valves operatively connected with or coordinated to a respective vehicle wheel each, diagonal stresses may occur, i.e., the pressure in two diagonally opposite pneumatic spring elements may be smaller or larger than the pressure in the other two diagonally opposite spring elements whereby no equalization takes place by means of the height-controlling valves. This will cause a marked deterioration of the driving conditions because the vehicle will react and behave differently in left turns than in right turns and because, during straight drives on uneven roads, strong wavering movements somewhat analogous to pitch and roll will occur.

The above-described disadvantages may be readily avoided and effectively eliminated in a relatively simple manner by the present invention, which consists essentially by operatively connecting the pneumatic spring elements coordinated to the respective vehicle wheels of a corresponding wheel axle, for example, the rear axle, by means of an equalizing line provided with a valve preferably electromagnetically actuated.

The closure valve may be connected thereby appropriately to the electric ignition system of the motor vehicle in such a manner that, when the ignition is turned off, the check valve will automatically close off the equalizing line. Any undesired discharge of the pneumatic pressure medium in the pneumatic spring system during stopping or, respectively, parking on an uneven road is thereby effectively eliminated by the use of such an arrangement.

Furthermore, the valve for the equalization line of the present invention may be operatively connected with the steering system of the motor vehicle, for instance, with the steering gear or with a pendulum system subjected to the centrifugal forces while driving through curves, in such a manner that, when driving through a curve, the valve will automatically close off the equalizing line so that no equalization will take place when driving through curves.

Instead of closing off the equalization line by means of the closure valve when driving through curves, it may also suffice, under certain circumstances, to provide in the equalizing line a continuously operative relatively strong throttling effect by any suitable known construction.

Accordingly, it is an object of the present invention to provide an equalization system for pneumatic spring systems of the type described hereinabove which effectively obviates the disadvantages and shortcomings of the prior art construction in a simple and reliable manner.

It is another object of the present invention to provide an equalization system for a pneumatic spring system which effectively prevents stresses in the vehicle superstructure such as the frame, chassis frame or body of a self-supporting body construction by minimizing or eliminating differences in pressure of the pressure medium between the two pairs of oppositely disposed wheels.

A further object of the present invention resides in the provision of an equalization system of the type described hereinabove which does not impair the desirable spring characteristics while driving through curves by automatically rendering the equalization system of the present invention inoperative under those conditions.

Still a further object of the present invention is the provision of simple means, preferably operated automatically, which assures the prevention of escape or leakage of any pressure medium through the equalization circuit according to the present invention when the vehicle is halted or parked on an uneven road.

These and other objects, features and advantages of the present invention will become more obvious from the following description when taken in connection with the accompanying drawing which shows, for purposes of illustration only, in the figures thereof one schematically illustrated embodiment of the present invention.

Referring now to the drawings.

Figure 1:
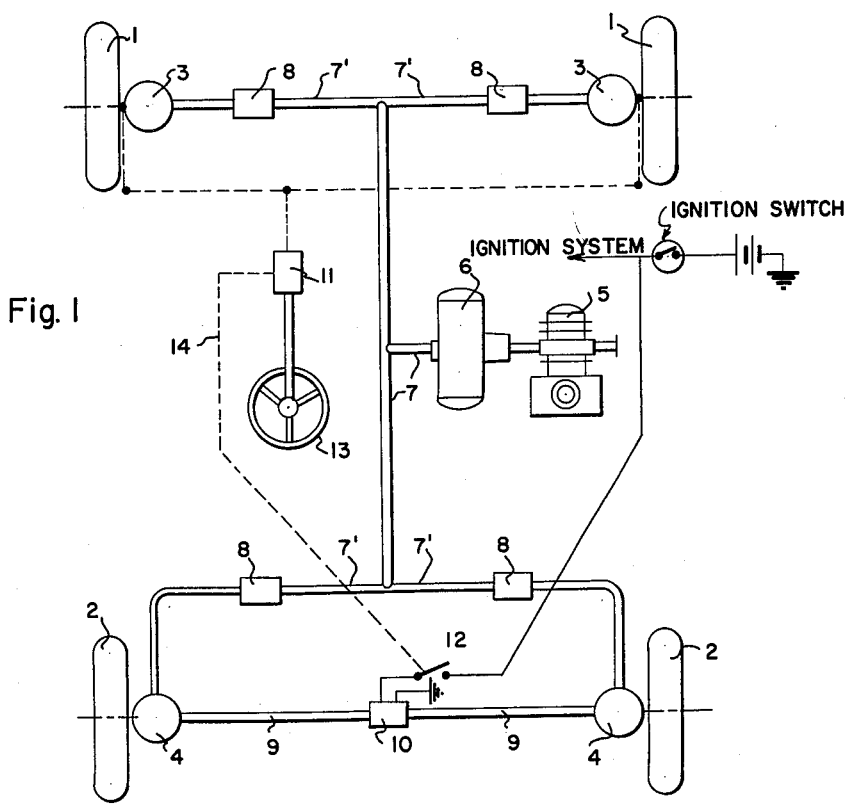
FIGURE 1 illustrates a preferred embodiment of the present invention.

Referring now more particularly to FIGURE 1, reference numeral 1 designates therein the oppositely disposed wheels of the front axle and reference numeral 2 the oppositely disposed wheels of the rear axle of a motor vehicle of suitable construction, not illustrated herein in detail. The pneumatic spring elements 3 and 4 are operatively connected with or coordinated in any suitable known manner to the pairs of oppositely disposed wheels 1 and 2 of the front and rear axle, respectively. Height-controlling valves 8 of any suitable construction of which one each is coordinated to a respective spring element 3 or 4 arranged in the branch lines 7' leading from compressor 5 via the supply reservoir 6 and the supply line 7 to the individual pneumatic spring elements 3 and 4, respectively. The pneumatic spring elements 4 of the rear axle of the motor vehicle are additionally connected with each other by the equalizing line 9 in by-passing relationship with respect to the corresponding height-adjusting valves 8. A closure valve 10 of suitable construction, preferably of the type that is electromagnetically actuated is disposed within the equalizing line 9. The valve 10 is thereby connected with the electrical ignition system of the motor vehicle in such a manner that, when the ignition is turned off, the valve 10 closes off the equalizing line 9. Moreover, the valve 10 is so arranged and constructed, in a manner known per se in the art, as to close off the equalization line 9 also while driving through curves. A relatively strong throttling effect, obtained by any known means, may also be substituted in the equalization line 9 for the closure valve 10 described hereinabove.

The control valve 10 may also be connected with the steering system, illustrated herein only schematically, for example, with the steering gear 11 in such a manner as to produce the closure or strong throttling effect in control valve 10 in dependence on the steering movement. This may be obtained in any suitable manner, for example, by providing a normally closed switch 12 in the energizing circuit for the electromagnetically operated control valve 10 which is opened in response to turning of the steering wheel 13. The arrangement may be made thereby in such a manner that switch 12 only opens after the steering wheel 13 is rotated through a predetermined angle.

It is of course understood that the present invention is not limited to the details shown and described herein only for illustrative purposes. The suspension and spring system of the vehicle may be of any suitable known construction. Moreover, the present invention is not limited in its application to a purely pneumatic spring system but may also be used to advantage with a combination spring system such as a combined hydraulic pneumatic spring system whereby an equalization line according to the present invention is used between two spring elements of a respective vehicle axle in a combined oil-pneumatic spring system.

Figure 2:
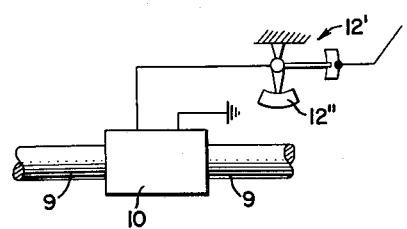
FIGURE 2 illustrates a modification thereof.

As illustrated in FIGURE 2, an arrangement such as a pendulum system responsive to the centrifugal forces within the vehicle while driving through curves may also be used to adjust the closure valve 10. The pendulum system may be used additionally with or in the alternative of the link means 14 transmitting the steering movements to switch 12 as illustrated in FIGURE 1, to adjust the closure valve 10 to the position thereof in which the equalization line 9 is closed off or at least strongly throttled when the pendulum system is actuated by centrifugal forces. The pendulum system will include closure valve 10, switch 12' and a pendulum 12'' operating the switch 12' in response to centrifugal forces acting on the vehicle.

Thus, while I have shown and described herein one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A pneumatic spring system for motor vehicles provided with two pairs of oppositely disposed wheels and with steering means and with an ignition system, comprising at least partly pneumatic spring means coordinated to each vehicle wheel, supply means for supplying the fluid medium under pressure to said spring means including height-regulating valve means coordinated to each spring means, equalization means operating to continually equalize the pressure of the fluid medium between the spring means coordinated to one pair of oppositely disposed wheels including an open equalizing conduit interconnecting the pneumatic spring means coordinated to said last-mentioned pair of wheels, valve means for selectively substantially closing off said conduit to interrupt said equalization between the spring means for said one pair of wheels, and control means for actuating said valve means to close said conduit during stops of the vehicle and when the vehicle is driven through curves, said control means comprising first means operatively connected to said ignition system of the vehicle for closing said valve means when the ignition system is turned off to render said equalization means automatically inoperative and for opening said valve means when the ignition system is turned on to render said equalization means operative and second means responsive to deviations of the vehicle from straight-line driving thereof for closing said valve means when the vehicle is driven through a curve independently of said first means connected to the ignition system of the vehicle to render said equalization means automatically inoperative when the vehicle is driven through said curve.

2. A pneumatic spring system according to claim 1, wherein said second means operatively connects said valve means with said steering means.

3. A pneumatic spring system according to claim 1, wherein said second means includes means responsive to centrifugal forces within the vehicle which occur while driving through a curve for actuating said valve means to move the same into the closing position thereof.

4. A pneumatic spring system according to claim 1, wherein said valve means produces at least a relatively strong throttling effect within said line in the said closing position thereof.

References Cited in the file of this patent

UNITED STATES PATENTS

| | | |
|---|---|---|
| 1,585,833 | Down | May 25, 1926 |
| 2,828,139 | Lautzenhiser | Mar. 25, 1958 |
| 2,882,068 | Faiver | Apr. 14, 1959 |
| 2,888,272 | Fletcher | May 26, 1959 |
| 2,939,722 | Dallas | June 7, 1960 |
| 2,950,124 | Pribonic | Aug. 23, 1960 |